United States Patent
Heffernan et al.

(10) Patent No.: US 9,734,514 B2
(45) Date of Patent: *Aug. 15, 2017

(54) METHODS AND APPARATUS TO MONITOR IMPRESSIONS OF SOCIAL MEDIA MESSAGES

(71) Applicant: The Nielsen Company (US), LLC, Schaumburg, IL (US)

(72) Inventors: Ronan Heffernan, Wesley Chapel, FL (US); Stanley Woodruff, Palm Harbor, FL (US); Steven Splaine, Tampa, FL (US); Alexandros Deliyannis, Tampa, FL (US); Dustin Barlow, Safety Harbor, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,720

(22) Filed: Jun. 8, 2015

(65) Prior Publication Data
US 2015/0269611 A1    Sep. 24, 2015

Related U.S. Application Data

(63) Continuation of application No. 13/691,371, filed on Nov. 30, 2012, now Pat. No. 9,055,021.

(51) Int. Cl.
*H04L 12/58* (2006.01)
*G06Q 30/02* (2012.01)
(Continued)

(52) U.S. Cl.
CPC ........ *G06Q 30/0246* (2013.01); *G06Q 50/01* (2013.01); *H04L 12/588* (2013.01);
(Continued)

(58) Field of Classification Search
CPC ........ H04L 12/588; H04L 51/32; H04L 67/22
(Continued)

(56) References Cited

U.S. PATENT DOCUMENTS 6,061,734 A    5/2000  London
6,434,614 B1   8/2002  Blumenau
(Continued)

OTHER PUBLICATIONS

IP Australia, "Patent Examination Report No. 1," issued in connection with Australian Patent Application No. 2013203643, mailed Nov. 13, 2014 (3 pages).
(Continued)

*Primary Examiner* — Lashonda Jacobs
(74) *Attorney, Agent, or Firm* — Hanley, Flight & Zimmerman, LLC

(57) ABSTRACT

Methods and apparatus are disclosed to monitor impressions of social media messages. An example method includes logging, at a server, a first impression for a first social media message based on a first universal resource locator corresponding to a first request requesting media, the first request sent in response to accessing the first social media message to be presented with the media. The method also includes logging, at the server, a second impression for a second social media message based on a second universal resource locator corresponding to a second request requesting the media, the second request sent in response to accessing the second social media message to be presented with the media.

25 Claims, 9 Drawing Sheets

(51) Int. Cl.
*H04L 29/08* (2006.01)
*G06Q 50/00* (2012.01)

(52) U.S. Cl.
CPC ............ *H04L 51/08* (2013.01); *H04L 51/32* (2013.01); *H04L 67/02* (2013.01); *H04L 67/22* (2013.01)

(58) Field of Classification Search
USPC ............ 709/203, 206, 217, 219, 223, 224
See application file for complete search history.

(56) References Cited

U.S. PATENT DOCUMENTS

| | | | |
|---|---|---|---|
| 6,510,465 B1 | 1/2003 | Bilansky et al. | |
| 7,302,481 B1 | 11/2007 | Wilson | |
| 7,406,434 B1* | 7/2008 | Chang | G06Q 10/06375 705/14.1 |
| 8,370,489 B2* | 2/2013 | Mazumdar | H04L 43/04 709/220 |
| 8,713,168 B2* | 4/2014 | Heffernan | H04L 43/04 705/14.41 |
| 8,843,626 B2* | 9/2014 | Mazumdar | H04L 43/04 709/224 |
| 8,849,998 B1 | 9/2014 | Merrill | |
| 8,954,536 B2* | 2/2015 | Kalus | H04L 43/04 709/217 |
| 9,218,612 B2* | 12/2015 | Mazumdar | H04L 43/04 |
| 2001/0054029 A1 | 12/2001 | Williams | |
| 2003/0046385 A1 | 3/2003 | Vincent | |
| 2005/0160002 A1 | 7/2005 | Roetter et al. | |
| 2008/0140502 A1 | 6/2008 | Birnholz et al. | |
| 2008/0189169 A1* | 8/2008 | Turpin | G06Q 30/02 705/7.33 |
| 2009/0112997 A1 | 4/2009 | Parker, II et al. | |
| 2009/0210808 A1 | 8/2009 | West | |
| 2009/0248656 A1 | 10/2009 | Blinnikka | |
| 2010/0121676 A1* | 5/2010 | Jackson | G06Q 30/0203 705/7.32 |
| 2010/0228582 A1 | 9/2010 | King et al. | |
| 2010/0250370 A1 | 9/2010 | Jones et al. | |
| 2010/0332330 A1 | 12/2010 | Goel et al. | |
| 2011/0047013 A1 | 2/2011 | McKenzie, III | |
| 2011/0137733 A1 | 6/2011 | Baird et al. | |
| 2011/0225036 A1 | 9/2011 | Reddy et al. | |
| 2011/0231240 A1* | 9/2011 | Schoen | G06Q 30/0242 705/14.41 |
| 2011/0238673 A1 | 9/2011 | Carter et al. | |
| 2011/0258050 A1 | 10/2011 | Chan et al. | |
| 2011/0313987 A1 | 12/2011 | Ghosh et al. | |
| 2011/0313996 A1 | 12/2011 | Strauss et al. | |
| 2012/0004959 A1 | 1/2012 | Benyamin et al. | |
| 2012/0011511 A1 | 1/2012 | Horvitz et al. | |
| 2012/0036080 A1 | 2/2012 | Singer et al. | |
| 2012/0047203 A1 | 2/2012 | Brown et al. | |
| 2012/0059722 A1 | 3/2012 | Rao | |
| 2012/0089455 A1* | 4/2012 | Belani | G06Q 30/0245 705/14.44 |
| 2012/0102113 A1 | 4/2012 | Chartier et al. | |
| 2012/0110027 A1* | 5/2012 | Falcon | G06Q 30/02 707/802 |
| 2012/0143713 A1* | 6/2012 | Dittus | G06Q 30/08 705/26.3 |
| 2012/0151322 A1* | 6/2012 | Lindsay | H04L 51/32 715/234 |
| 2012/0166520 A1* | 6/2012 | Lindsay | G06Q 30/0241 709/203 |
| 2012/0173345 A1 | 7/2012 | Yanefski et al. | |
| 2012/0198072 A1 | 8/2012 | Kirsch et al. | |
| 2012/0215621 A1* | 8/2012 | Heffernan | H04L 43/04 705/14.41 |
| 2012/0239809 A1* | 9/2012 | Mazumdar | H04L 43/04 709/224 |
| 2012/0284340 A1 | 11/2012 | Young | |
| 2013/0014137 A1 | 1/2013 | Bhatia et al. | |
| 2013/0066714 A1* | 3/2013 | Umeda | G06Q 50/01 705/14.46 |
| 2013/0066725 A1* | 3/2013 | Umeda | G06Q 30/0275 705/14.66 |
| 2013/0073378 A1* | 3/2013 | Naveh | G06Q 10/10 705/14.41 |
| 2013/0073388 A1* | 3/2013 | Heath | G06Q 50/01 705/14.53 |
| 2013/0080264 A1* | 3/2013 | Umeda | G06Q 30/02 705/14.69 |
| 2013/0097285 A1 | 4/2013 | van Zwol et al. | |
| 2013/0218862 A1* | 8/2013 | Ghosh | G06F 17/30554 707/706 |
| 2013/0268351 A1* | 10/2013 | Abraham | G06Q 30/0241 705/14.45 |
| 2013/0282898 A1* | 10/2013 | Kalus | G06Q 30/02 709/224 |
| 2013/0332604 A1* | 12/2013 | Seth | G06Q 30/0201 709/224 |
| 2013/0346154 A1* | 12/2013 | Holz | G06Q 30/0201 705/7.31 |
| 2014/0040020 A1* | 2/2014 | Shanmugam | G06Q 30/02 705/14.45 |
| 2014/0075018 A1* | 3/2014 | Maycotte | H04L 67/22 709/224 |
| 2014/0089775 A1 | 3/2014 | Worsley et al. | |
| 2014/0156761 A1* | 6/2014 | Heffernan | H04L 51/32 709/206 |
| 2014/0214978 A1* | 7/2014 | Splaine | H04L 51/32 709/206 |
| 2014/0250223 A1* | 9/2014 | Heffernan | H04L 43/04 709/224 |

OTHER PUBLICATIONS

United States Patent and Trademark Office, "Non-Final Office Action," issued in connection with U.S. Appl. No. 13/756,141, mailed Nov. 20, 2014 (12 pages).

IP Australia, "Patent Examination Report No. 1," issued in connection with corresponding Australian Patent Application No. 2013203743, mailed Oct. 14, 2014 (3 pages).

United States Patent and Trademark Office, "Non-Final Office Action", issued in connection with corresponding U.S. Appl. No. 13/691,371, dated Oct. 9, 2014 (13 pages).

United States Patent and Trademark Office, "Notice of Allowance", issued in connection with corresponding U.S. Appl. No. 13/691,371, dated Feb. 2, 2015 (7 pages).

United States Patent and Trademark Office, "Non-Final Office Action", issued in connection with U.S. Appl. No. 13/756,141, dated May 13, 2015 (42 pages).

IP Australia, "Notice of Acceptance," issued in connection with corresponding Australian Patent Application No. 2013203743, mailed Oct. 26, 2015 (2 pages).

IP Australia, "Notice of Acceptance," issued in connection with Australian Patent Application No. 2013203643, mailed Jan. 5, 2016 (2 pages).

IP Australia, "Examination Report," issued in connection with Australian Patent Application No. 2015275345, on Dec. 7, 2016 (2 pages).

* cited by examiner

| MEDIA UNIFORM RESOURCE LOCATOR | SOCIAL MEDIA MESSAGE | SPONSORED MEDIA | MESSAGE SENDER |
|---|---|---|---|
| URL_X 118 | MESSAGE_X 114a | IMAGE_1 112 | CELEBRITY_D 504 |
| URL_Y 304 | MESSAGE_Y 316 | | CELEBRITY_D 504 |
| URL_Z 306 | MESSAGE_Z 318 | | CELEBRITY_D 504 |
| URL_Q 308 | MESSAGE_Q 320 | IMAGE_2 328 | CELEBRITY_A 404 |
| URL_R 310 | MESSAGE_R 322 | | CELEBRITY_B 406 |
| URL_S 312 | MESSAGE_S 324 | | PERSON_C 408 |
| URL_L 330 | MESSAGE_L 336 | AUDIO_1 342 | PERSON_E 344 |
| URL_M 332 | MESSAGE_M 338 | | PERSON_E 344 |
| URL_N 334 | MESSAGE_N 340 | | CELEBRITY_F 346 |
| URL_O 348 | MESSAGE_T 354 | VIDEO_1 360 | CELEBRITY_G 366 |
| URL_P 350 | MESSAGE_U 356 | VIDEO_2 362 | CELEBRITY_H 368 |
| URL_Q 352 | MESSAGE_W 358 | VIDEO_3 364 | CELEBRITY_H 368 |

METHODS AND APPARATUS TO MONITOR IMPRESSIONS OF SOCIAL MEDIA MESSAGES

RELATED APPLICATIONS

This patent claims the benefit of U.S. patent application Ser. No. 13/691,371, now U.S. Pat. No. 9,055,021, entitled "Methods and Apparatus to Monitor Impressions of Social Media Messages," filed on Nov. 30, 2012, which is incorporated by reference in its entirety.

FIELD OF THE DISCLOSURE

This disclosure relates generally to audience measurement, and, more particularly, to methods and apparatus to monitor impressions of social media messages.

BACKGROUND

Online social messaging services enable users to send social media messages to many users at once. In some examples, such social media messages are used to disseminate advertisements to a mass audience.

BRIEF DESCRIPTION OF THE DRAWINGS

FIG. 3 illustrates an example table that may be used to map corresponding uniform resource locators, social media messages, and media files.

DETAILED DESCRIPTION

Figure 1:
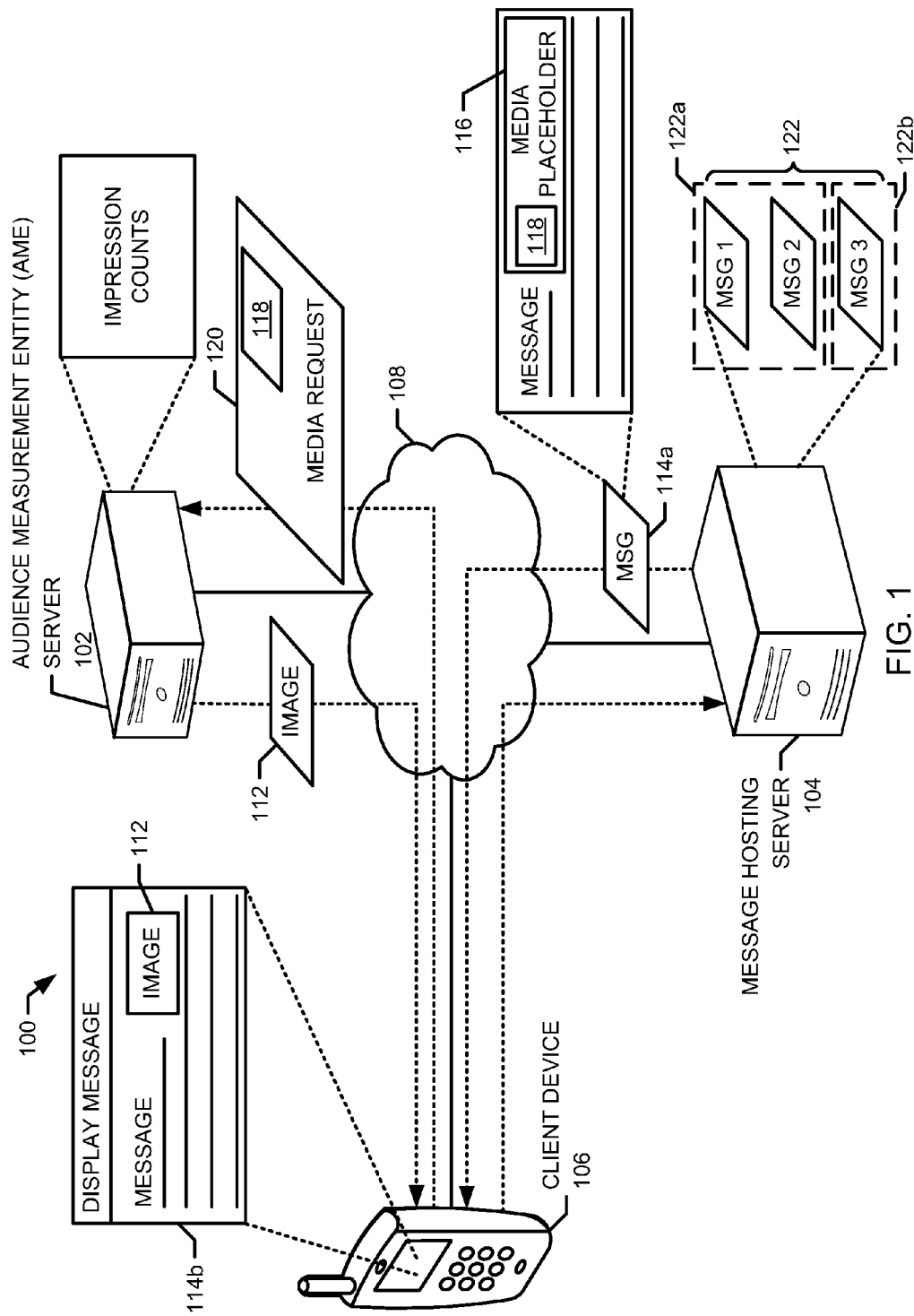
FIG. 1 is an illustration of an example environment in which examples disclosed herein may be implemented to monitor impressions of social media messages.

Social messaging has become a widely used medium in which users disseminate and receive information. Online social messaging services (such as Facebook or Twitter) enable users to send social media messages or instant messages to many users at once. A social media message may include links (e.g., uniform resource locators (URLs)) to content available on the Internet. A browser or messaging client retrieves the external content of the social media message by following the links (e.g., by sending a hypertext transfer protocol (HTTP) request to a URL specified in the message). The content retrieved by the URL(s) may include one or more different types of media such as text, images, audio and/or video. The message is constructed from the retrieved content and is then displayed by a client device. Some social messaging services enable users to "follow" other users (e.g., subscribe to receive messages sent by select users (e.g., via the Twitter® service)). For example, a user following (or subscribed to) a celebrity in the Twitter® service may receive indications via a client application (e.g., the TweetDeck® client application or any other social media messaging client application) executing on a client device when the celebrity sends or posts a social media message.

Social media messages may be used to convey many different types of information. In some examples, sponsored social media messages are used to convey information about a product or service. For example, a message sender may convey a social media message indicating that the message sender is eating at a certain restaurant. In other examples, social media messages are used to disseminate advertisements to a mass audience. For example, a sponsored social media message is a social media message for which a person (e.g., a celebrity or other person who is well known in the general population and/or well known within one or more sub-populations) is paid to send. Such sponsored social media messages are sent to followers and advertise, endorse, or otherwise convey a message in support of a product, a service, a company, etc. of the person or entity paying (or sponsoring) the message sender to send the sponsored social media message.

Monitoring impressions of advertisements, endorsements, or other messages delivered via social media messages is useful for generating impression statistics (e.g., reach and/or frequency) of the advertisements, endorsements, and/or other messages. In some examples disclosed herein, monitored social media messages are configured to be rendered (e.g., displayed or otherwise presented) with media (e.g., visual images, video, audio, text, etc.) and/or links (e.g., URLs) to such media that is served by one or more servers. End user devices reconstruct social media messages for presentation to users by retrieving the external media components from one or more servers. Examples disclosed herein monitor impressions to social media messages by tracking when media is requested (e.g., via one or more HTTP request messages) from server(s). To track such network requests for media from client devices (e.g., end user devices), an audience measurement entity (AME) server is used in disclosed examples to host the media, and to serve the media to the requesting client device(s). To detect instances of rendered social media messages, a different uniform resource locator (URL) is assigned to different social media messages (or component(s) thereof). When a client device receives a social media message sent by a message sender, the client device will send one or more requests to the AME server for corresponding media using the URL (uniform resource locator) assigned to the media. The AME server increments a corresponding counter every time it serves media for a corresponding one of the URLs. In this manner, the AME server uses the assigned URL as a unique identifier to determine which social media message should be credited with an impression.

For example, if a manufacturer elects to be a sponsor of messages sent by a recording artist, the manufacturer (or sponsorer) enters into an agreement with the recording artist (e.g., a sender of one or more sponsored messages), in which the recording artist agrees to send one or more different social media messages promoting the manufacturer and/or its products. If the manufacturer sponsors three distinct social media messages (e.g., messages A, B and C), the manufacturer may want to compare the performances of the three social media messages (e.g., messages A, B and C) to one another and/or to other social media messages and/or to an expected or desired performance (e.g., message reach and/or frequency) of the three sponsored social media messages (e.g., messages A, B and C). In some examples, the AME server (or a third-party server contracted by the AME) hosts media that corresponds to an object (e.g., an avatar, text, audio or visual image) to be presented with each of the three social media messages A, B and C. In such examples, the AME creates different URLs for use in retrieving the media when the three different social media messages are being rendered by a client device. In such examples, the manufacturer assigns (e.g., embeds) each of the URLs to a different, respective one of the three social media messages A, B and C. When the recording artist sends his/her followers the social media messages A, B, C including their respective URLs, receiving user devices that open or otherwise access the message will retrieve the media using the corresponding URL embedded in the message being accessed. In particular, the receiving devices (e.g., client devices) send HTTP requests for the media using the URLs received in the social media messages. When the AME server receives a request for the media, it identifies which URL is being used to make the request and awards an impression credit to a corresponding one of the social media messages (e.g., by incrementing a corresponding counter) based on the identified URL. In this manner, as the AME server credits (or logs) impressions for respective ones of the URLs used for image requests. Because each URL is uniquely associated with a respective one of the social media messages A, B or C, the URL logs/counts reflect the number of impressions of each respective message A, B or C. The aggregate impression counts can then be used to track total impressions, reach, and/or frequency of impressions for each social media message A, B, C.

Examples disclosed herein may be used to measure audience exposure and/or interaction with advertisements, endorsements, and/or other information in social media messages and/or similar services accessed by users using service-specific applications (e.g., the TweetDeck® application) and/or web browsers. Service-specific applications (e.g., client applications for the Twitter® service) may be used on mobile devices (e.g., mobile phones, tablets, smart watches, etc.) or desktop computers and do not require use of a web browser. In some examples, techniques disclosed herein are particularly useful for non-web browser user interfaces. For example, a user may access social media messages via a messaging client application installed on a mobile device or other computing device rather than through a web browser. Although examples disclosed herein are described in connection with non-browser based messaging client applications that render social media messages, disclosed techniques may also be used in connection with browser based interfaces used to present social media messages. Media files referred to in hypertext markup language (HTML) documents or web pages are not necessarily limited to visual images (e.g., files with file type extensions such as .bmp, .gif, .jpg, etc.) and may be visual images, text, audio, moving pictures, static images, etc.

FIG. 1 is an illustration of an example environment 100 in which examples disclosed herein may be implemented to monitor impressions of social media messages. The example environment 100 of FIG. 1 includes an audience measurement entity (AME) server 102, a message hosting server 104 and a client device 106. In some examples, the AME server 102 is implemented using multiple devices and/or the message hosting server 104 is implemented using multiple devices. For example, the AME server 102 and/or the message hosting server 104 may include disk arrays or multiple workstations (e.g., desktop computers, workstation servers, laptops, etc.) in communication with one another. In the illustrated example, the AME server 102 is in communication with the message hosting server 104 and/or the client device 106 via one or more wired and/or wireless networks represented by network 108. Example network 108 may be implemented using any suitable wired and/or wireless network(s) including, for example, one or more data buses, one or more Local Area Networks (LANs), one or more wireless LANs, one or more cellular networks, the Internet, etc. As used herein, the phrase "in communication," including variances thereof, encompasses direct communication and/or indirect communication through one or more intermediary components and does not require direct physical (e.g., wired) communication.

In the illustrated example, the client device 106 is used to receive, reconstruct and present social media messages. For example, a user following a message sender (e.g., a celebrity) may desire to read all social media messages conveyed by the message sender. In some examples, the user executes a non-browser based application on the client device 106 to request (e.g., via an HTTP request) from, for example, the message hosting server 104, all social media messages conveyed by the message sender.

The client device 106 renders or reconstructs any social media messages (e.g., an example message (MSG) 114a, 114b) returned by the message hosting server 104. In the example of FIG. 1, the messages 114a and 114b are the same message at two different points in time. Message 114a is the message prior to being rendered on the client device 106. Message 114b is the message after rendering.

As described above, some social media messages may be sponsored. Some such social media messages may include only text. Some social media messages may include embedded media or links to external media in addition to, or instead of, text. In the illustrated example, the client device 106 requests and receives the example social media message 114a, or the social media message 114a is pushed to the client device 106 by, for example, the message hosting server 104. In the illustrated example, the client device 106 renders the message 114b with corresponding text and an image 112. For example, the text may indicate that the celebrity enjoys a sponsor's product, or it may convey a slogan associated with the product. The image may be a logo identifying the sponsor or product. In the illustrated example, the image 112 is an avatar image (e.g., a logo or other image accompanying a social media message) that is displayed along with the social media message 114b. However, examples disclosed herein may be used in connection with other types of media in social media messages including, for example, video, audio, text, streaming media, etc.

To enable tracking impressions of the social media message, the example social media message 114a of FIG. 1 includes a media placeholder 116 rather than the image 112 itself when the social media message 114a is sent by the message hosting server 104. In the illustrated example, the AME server 102 hosts the image 112, and the media placeholder 116 includes a uniform resource locator (URL) 118 usable to retrieve the image 112 from the AME server 102. In the illustrated example, to render the social media message 114a, the client device 106 sends a media request 120 for the image 112 to, for example, the AME server 102. In the illustrated example, the media request 120 includes the URL 118. In some examples, the media request 120 includes a device identifier. For example, the media request 120 may include a Media Access Control (MAC) address, an Internet Protocol (IP) address, etc.). The example AME server 102 may use the device identifier to track device exposures. The client device 106 displays or presents the social media message 114b and the image 112 (in place of the placeholder 116) when the AME server 102 serves or returns the image 112.

In the illustrated example, when a message sender (e.g., a celebrity) composes a social media message 122, that message 122 is sent to the message hosting server 104. The example message hosting server 104 hosts social media messages 122 that are subsequently sent to client devices, such as the example client device 106. In the illustrated example, the message hosting server 104 hosts sponsored social media messages 122a and non-sponsored social media messages 122b. In the illustrated example, sponsored social media messages 122a stored at the message hosting server 104 include a text portion and a media portion. The message hosting server 104 stores the text portion and corresponding media placeholders (e.g., similar to the media placeholder 116). As a result, the message hosting server 104 conserves memory space by storing placeholders for media rather than the media itself. In the illustrated example, the message hosting server 104 serves sponsored social media messages 122a and non-sponsored social media messages 122b in the same manner. For example, the message hosting server 104 processes a request for a social media message 122 similarly regardless of whether the social media message 122 is a sponsored social media message 122a or a non-sponsored social media message 122b. However, some social media messages (e.g., the social media messages 114a and 122a) include a URL (e.g., the URL 118) used by the AME server 102 to track impressions of the social media messages 114a, 122a.

In the illustrated example, the AME server 102 hosts media for presenting with social media messages 114a, 122a. For example, the AME server 102 of the illustrated example includes a media database that stores image files or other types of media files. Additionally or alternatively, the AME server 102 may be in communication with a geographically separate media database (e.g., a server of a third-party contracted by the AME) that hosts the image or other media files. In such examples, the AME server 102 retrieves images files (or other media files) from the separate media database to serve the media to the requesting devices. Alternatively, the separate media database may be provided with a server to serve the hosted media directly to the requesting devices.

The example AME server 102 of the illustrated example operates to track impressions of social media messages 114a and 122a. For example, to reconstruct or render the social media message 114a, the client device 106 uses the URL 118 corresponding to the media placeholder 116 to request the image 112. Thus, the AME server 102 receives the media request 120 for the image 112 from the client device 106. Using the URL 118 in the media request 120, the AME server 102 identifies the image 112 and the corresponding social media message 114a. The AME server 102 serves the image 112 to the requesting device (e.g., the client device 106). In addition, the AME server 102 credits (or logs) an impression of the social media message 114a based on the received URL 118. In this manner, the AME server 102 tracks total impressions and frequency of impressions for social media messages based on the URLs used by received media requests. In some examples, the URL may be for an element that is not displayed (e.g., a clear pixel) and, thus, the image file returned by the AME server 102 may not be seen by the end user but may still function to identify the corresponding social media message.

In some examples, multiple, different URLs may correspond to the same media hosted at the AME server 102. In such examples, the AME server 102 returns the same media when any of the associated media placeholder(s) is received. In some examples, a sponsor or advertiser may present the same embedded media (e.g., a same logo or other identifying image or media) across multiple sponsored social media messages to create uniformity and common identity across the multiple social media messages. Although media may be the same across multiple sponsored social media messages that are sent, assigning different URLs for the embedded media to the different messages as disclosed herein enables the AME server 102 to identify which social media message(s) to credit with impression(s) when media request(s) are received using different URLs. For example, an advertiser may produce an advertising campaign with three different social media messages A, B and C. Each of the three different social media messages A, B, C may include a unique media placeholder, but each of the three media placeholders may be associated with the same image, such as a logo of the sponsor. While the illustrated example describes one image associated with three different URLs, it is also possible for a single image to be associated with any number of URLs. For example, a sponsor celebrating its 100th anniversary may have multiple different social media messages with different slogans and/or logos from the past. As a result, one image may be associated with one or more different URLs. In such examples, each of three different social media messages A, B and C sent by the same or different senders may be assigned a different image or media with a corresponding different URL. In other examples, the social media message may be sent through multiple, different spokespersons (Celebrity A, Celebrity B and Person C). The same media/image can be used by each spokesperson but the media of each message is retrieved by a different URL to enable tracking the effectiveness of different spokespersons.

Figure 2:
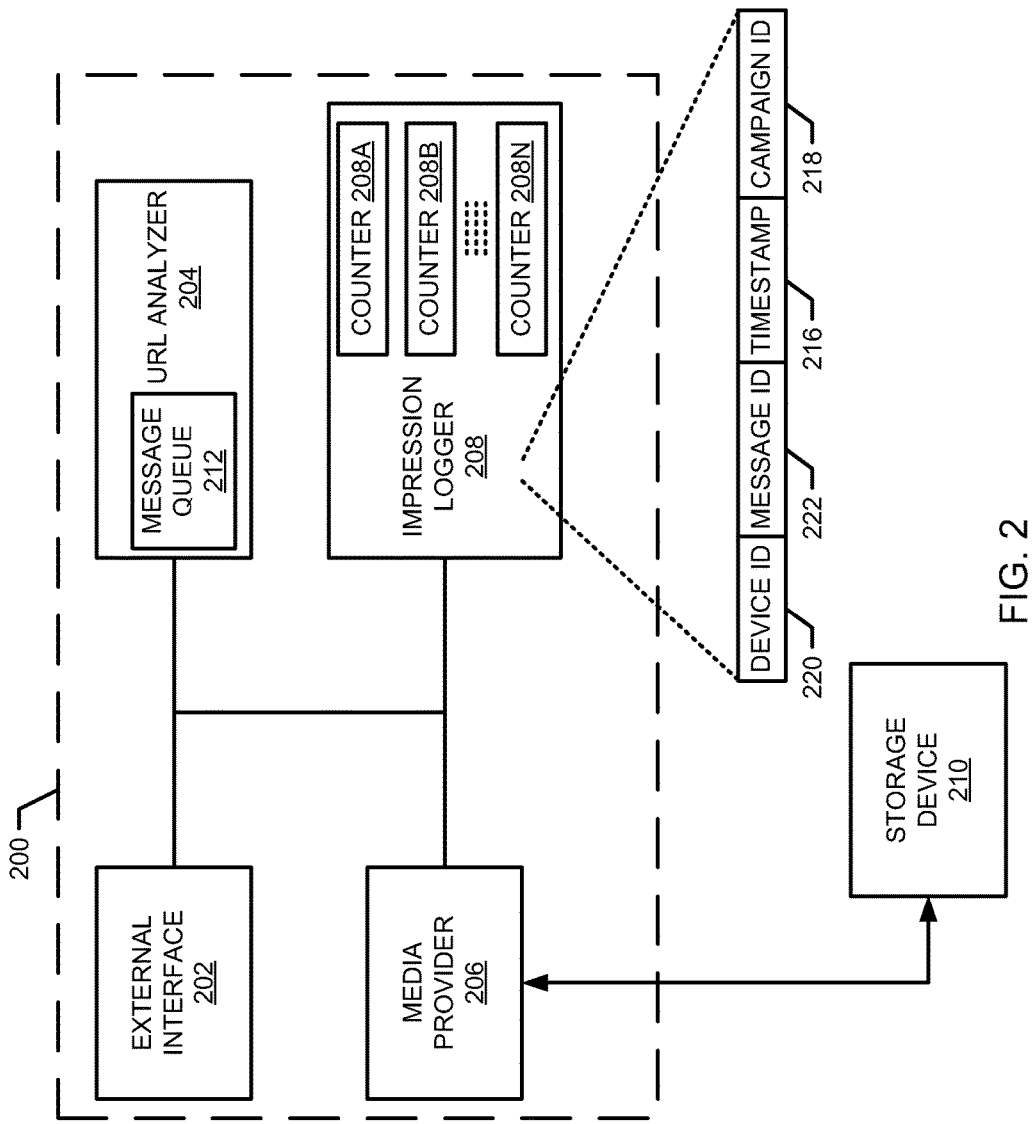
FIG. 2 illustrates an example social message tracker that may be used to log impressions for social media messages.

FIG. 2 illustrates an example social message tracker 200 that may be used to log impressions for social media messages (e.g., the messages 114a and 122a of FIG. 1). In the illustrated example, the social message tracker 200 includes an example external interface 202, an example URL analyzer 204, an example media provider 206 and an example impression logger 208. In the illustrated example, the social message tracker 200 is in communication with an example storage device 210 to store media. In some examples, the social message tracker 200 is in communication with the storage device 210 via one or more networks and/or local communication interfaces. In some examples, the storage device 210 is local to the social message tracker 200 and/or integrated therein. In some examples, the social message tracker 200 is included in the audience measurement entity (AME) 102 of FIG. 1. In other examples, the social message tracker 200 is separate from the AME server 102 and in communication with the AME server 102 via, for example, the Internet and/or a local network.

While an example manner of implementing the social message tracker 200 is illustrated in FIG. 2, one or more of the elements, processes and/or devices illustrated in FIG. 2 may be combined, divided, re-arranged, omitted, eliminated and/or implemented in any other way. Further, the example external interface 202, the example URL analyzer 204, the example media provider 206, the example impression logger 208, the example storage device 210, the example message queue 212 and/or, more generally, the example social message tracker 200 of FIG. 2 may be implemented by hardware, software, firmware and/or any combination of hardware, software and/or firmware. Thus, for example, any of the example external interface 202, the example URL analyzer 204, the example media provider 206, the example impression logger 208, the example storage device 210, the example message queue 212 and/or, more generally, the example social message tracker 200 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example external interface 202, the example URL analyzer 204, the example media provider 206, the example impression logger 208, the example storage device 210 and/or the example message queue 212 are hereby expressly defined to include a tangible computer readable storage device or storage disk such as a memory, DVD, CD, Blu-ray storing the software and/or firmware. Further still, the example social message tracker 200 of FIG. 2 may include one or more elements, processes and/or devices in addition to, or instead of, those illustrated in FIG. 2, and/or may include more than one of any or all of the illustrated elements, processes and devices.

In the illustrated example, the social message tracker 200 is provided with the external interface 202 to exchange communications with client devices (e.g., the client device 106 of FIG. 1). For example, the external interface 202 receives the media request 120 (FIG. 1) from the example client device 106 (FIG. 1), and provides the media request 120 to the URL analyzer 204. In some examples, the external interface 202 may perform additional processing to provide information to the URL analyzer 204. For example, the media request 120 received by the external interface 202 may be encoded using a different protocol (e.g., HTTP, simple object access protocol (SOAP), etc.) than what the URL analyzer 204 is configured to process. In some such examples, the external interface 202 decodes or translates the received media request 120 before providing the media request 120 to the URL analyzer 204. In the illustrated example, the example external interface 202 is also provided to send the requested media (e.g., the image 112 of FIG. 1) to the requesting device (e.g., the example client device 106) when the media is identified by the URL analyzer 204 as described below.

In the illustrated example, the URL analyzer 204 analyzes the URL 118 (FIG. 1) in the media request 120 (FIG. 1) received from the external interface 202. Using the URL 118, the URL analyzer 204 determines that the media request 120 corresponds to a particular sponsored social media message (e.g., message 114a, 122a). In some examples, the URL analyzer 204 may use a lookup table to determine the social media message (e.g., message 114a, 122a) to which the media request 120 corresponds. However, other methods to determine that the received media request 120 arises from an impression of a specific sponsored social media message (e.g., message 114a, 122a) at a user device (e.g., the client device 106) may additionally or alternatively be used. In illustrated examples disclosed herein, the URL analyzer 204 also uses the URL 118 to determine which media (e.g., the image 112 of FIG. 1) is being requested by the media request 120. In other examples, the media request 120 may include other information (e.g., one or more image identifiers, one or more image filenames, etc.) specifying the media (e.g., the image 112) being requested by the media request 120. An example lookup table data structure that may be used by the URL analyzer 204 to identify the requested image 112 is described below in connection with FIG. 3. In some examples, the URL analyzer 204 includes an example message queue 212 to store the message requests as they are received from the example external interface 202. In some examples, the URL analyzer 204 analyzes the message requests stored in the message queue 212 in the same order received from the external interface 202 (e.g., first-in, first-out).

To provide media (e.g., image files, visual images, audio, text, etc.) in response to requests from client devices, the example social message tracker 200 is provided with the media provider 206. In the illustrated example, the media provider 206 receives a media identifier from the example URL analyzer 204 and/or analyzes information in the media request 120 specifying media (e.g., the image 112) being requested. The example media provider 206 uses the media identifier and/or other information (e.g., an image identifier, an image filename, etc.) from the media request 120 to locate the requested media in a media database (e.g., stored in the example storage device 210). In some examples, the storage device 210 is separate from but local to the example social message tracker 200 (e.g., in communication with the media provider 206 via local interfaces such as Universal Serial Bus (USB), FireWire, Small Computer System Interface (SCSI), etc.). In other examples, the storage device 210 is located at an off-site location and communicates with the media provider 206 over long distances via, for example, Ethernet, internet Small Computer System Interface (iSCSI), optical and/or fiber channels, etc. In some examples, the requested media may be hosted on a third-party server or network. For example, the requested media may be hosted on a content delivery network. The example media provider 206 then provides the requested media to the example external interface 202.

In the illustrated example, the impression logger 208 credits (or logs) impressions to social media messages based on indications received from the URL analyzer 204. For example, the URL analyzer 204 may send a message to the impression logger 208 instructing the impression logger 208 to increment a specific counter 208a, 208b, or 208n of a corresponding identified social media message. The message may reference the counter to be incremented in any desired (or suitable) fashion (e.g., by sending an address of the counter). Alternatively, the URL analyzer 204 may simply list the corresponding URL in a data structure or it may tabulate all the URLs in a single data structure with corresponding memory addresses of the counters to be incremented for each URL. In some examples, the impression logger 208 appends and/or prepends additional information while crediting social media messages. In some examples, the impression logger 208 appends a message identifier 222 (e.g., a message ID) indicating the example social media message. In some examples, the impression logger 208 appends a timestamp 216 indicating the date and/or time the example social message tracker 200 received a request for corresponding media. In some examples, the impression logger 208 appends a campaign identifier 218 (e.g., a campaign ID) indicating which advertising campaign includes the social media message. In some examples, the impression logger 208 periodically and/or aperiodically communicates the aggregate impression counts for each social media message to a corresponding sponsor. Thus, the sponsor may use the aggregate impression counts to track total impressions and/or frequency of impressions for each sponsored social media message.

In some examples, information regarding the user is collected from the requesting client device (e.g., the example client device 106 of FIG. 1) via, for example, media requests (e.g., the media request 120 of FIG. 1). In some examples, this information is used to develop demographic (or census) information regarding the users of client devices requesting the sponsored social media messages. For example, when a client device requests media from the AME server 102, the client device includes a device identifier 220 such as an IP address in the media request so that the requested media is served back to the requesting client device. For devices with static public IP addresses, the IP address can be used to retrieve demographic information in examples in which such users have previously provided such demographic information. For example, users may agree to participate in market research panels or audience member panels, and provide demographic information that the AME stores in association with public IP addresses of those users. In some instances, a mobile device such as the example client device 106 changes IP addresses several times throughout the day. As a result, the IP address may not be used, in such instances, to identify the exact user. However, the IP address can be used to identify general geographic locations of the user. Thus, an analysis of the logged impressions may indicate that certain social media messages are more effective in reaching more people in certain parts of the country than in others. In addition, the logged impressions may indicate that users of client devices in certain cities are more responsive to social media messages conveyed by some messages senders and not others. In some examples, the device identifier 220 may additionally or alternatively identify what kind of a device is requesting the media. Other demographic information regarding the client device or the user may also be gathered using any other suitable information included in a message request.

In some examples, a client device may include a full-capabilities web browser. Such web browsers enable cookies (e.g., HTTP cookies, web cookies, browser cookies, etc.) to be downloaded by the client device. These cookies may then gather information about the user as the user continues to browse the Internet via the web browser. For example, a cookie may be used to store information regarding which web pages were accessed, how often these pages were accessed, whether the user engages is a login process or is still logged in, etc. In some examples, the cookies are periodically or aperiodically transmitted to the AME server 102. In some examples, the AME server 102 may map the cookies to demographic information of the user and/or other information identifying the user. For example, the cookies may be mapped to census information including the demographics of the users.

In some examples, the requested media may be hosted by a third-party. For example, the requested media file may be hosted on a content delivery network. In such a network, media files are distributed amongst several local nodes connected by the content delivery network. In some such examples, the AME server 102 periodically or aperiodically retrieves impressions logs from the content delivery network.

FIG. 3 illustrates an example data structure 300 that maps URLs, social media messages and media. In the illustrated example, each URL corresponds to a different, respective social media message. For example, an example URL (URL_X) 118 (e.g., the example URL 118 of FIG. 1) corresponds to an example message (MESSAGE_X) 114*a* (e.g., the example message 114*a*, 114*b* of FIG. 1), an example URL (URL_Y) 304 corresponds to an example message (MESSAGE_Y) 316, etc. However, in the illustrated example, multiple URLs in the data structure 300 correspond to a same media (e.g., a same image file, a same audio file, a same visual image file, etc.). For example, an example image (IMAGE_1) 112 (e.g., the example image 112 of FIG. 1) corresponds to all of the URL (URL_X) 118, the URL (URL_Y) 304 and an example URL (URL_Z) 306. In the illustrated example, an example URL (URL_Q) 308, an example URL (URL_R) 310, and an example URL (URL_S) 312 correspond to an example image (IMAGE_2) 328. However, each of the URLs 308, 310 and 312 corresponds to a different social media message (e.g., an example message (MESSAGE_Q) 320, an example message (MESSAGE_R) 322 or an example message (MESSAGE_S) 324). In the illustrated example, an example URL (URL_L) 330, an example URL (URL_M) 332, and example URL (URL_N) 334 correspond to an example audio file denoted as AUDIO_1 342. However, each of the URLs 330, 332 and 334 corresponds to a different social media message (e.g., an example message (MESSAGE_L) 336, an example message (MESSAGE_M) 338 or an example message (MESSAGE_N) 340). In the illustrated example, the URL analyzer 204 (FIG. 2) uses the URL 118 for a received media request (e.g., the media request 120 of FIG. 1) to inform the example media provider 206 (FIG. 2) of the corresponding image 112. In addition, the URL analyzer 204 informs the example impression logger 208 (FIG. 2) of the sponsored social media message 114*a* to credit with an impression based on the message 114*a* being associated with the URL 118 in the data structure 300.

In some examples, copies of the sponsored media may be stored in the example data storage 210, and each copy of the sponsored media corresponds to a different filename. For example, an example video file (VIDEO_1) 360, an example video file (VIDEO_2) 362 and an example video file (VIDEO_3) 364 may all correspond to the same video file (e.g., they may all be copies of the same video file), but be stored in the example storage device 210 with different filenames. In other examples, each of the videos 360, 362 and 364 may correspond to different video files. For example, the video (VIDEO_1) 360 may be a video of an example sender (Celebrity_G) 366 drinking a sponsor's beverage and the video (VIDEO_2) 362 and video (VIDEO_3) 364 may be two different videos of an example sender (Celebrity_H) 368 drinking the sponsor's beverage. Any suitable URL format may be used to distinguish the URLs from one another when used by a client device to request media. For example, the URLs 118, 304, 306, 308, 310, 312, 330, 332, 334, 348, 350, 352 may be stored in the data structure 300 as short URLs (e.g., http://a.me/vid1.mov) or any other URL format (e.g., http://www.amesite.com/vid1.mov). Storing the URLs as short URLs may be beneficial in minimizing the storage space used in the example data structure 300. In some examples, different media filenames in the URLs may be used to distinguish between different corresponding media messages. For example, a URL "http://www.amesite.com/vid-1.mov" may be used for the URL (URL_O) 348 corresponding to the message (MESSAGE_T) 354, a URL "http://www.amesite.com/vid-2.mov" may be used for the URL (URL_P) 350 corresponding to the message (MESSAGE_U) 356, and a URL "http://www.amesite.com/vid-3.mov" may be used for the URL (URL_Q) 352 corresponding to the message (MESSAGE_W) 358. In such examples, the vid-1.mov filename corresponds to the video file (VIDEO_1) 360, the vid-2.mov filename corresponds to the video file (VIDEO_2) 362, and the vid-3.mov filename corresponds to the video file (VIDEO_3) 364. In some examples, the video files 360, 362, 364 may be copies of the same video. Alternatively, the video files 360, 362, 364 may be different videos. Other sponsored media and media filename combinations may additionally or alternatively be used.

In the illustrated example of FIG. 3, each URL corresponds to one or more message senders (A, B, C, D, E, F, G, and H). For example, the URL (URL_X) 118, the URL (URL_Y) 304 and the URL (URL_Z) 306 each correspond to an example sender (Celebrity_D) 504, the URL (URL_Q) corresponds to an example sender (Celebrity_A) 404, the URL (URL_L) 330 and the URL (URL_M) 332 correspond to an example sender (Person_E) 344, etc. In some examples, the URL analyzer 204 may send a message to the impression logger 208 instructing the impression logger 208 to increment a counter corresponding to a specific message sender. The message may reference the counter to be incremented in any desired (or suitable) fashion. In some examples, the counter may indicate cumulative impressions credited to social media messages corresponding to a message sender. For example, the URL analyzer 204 uses any of the URL (URL_X) 118, the URL (URL_Y) 304 and/or the URL (URL_Z) 306 from a received media request (e.g., the media request 120 of FIG. 1) to inform the example impression logger 208 to increment a counter corresponding to the sender (Celebrity_D) 504.

Figure 8:
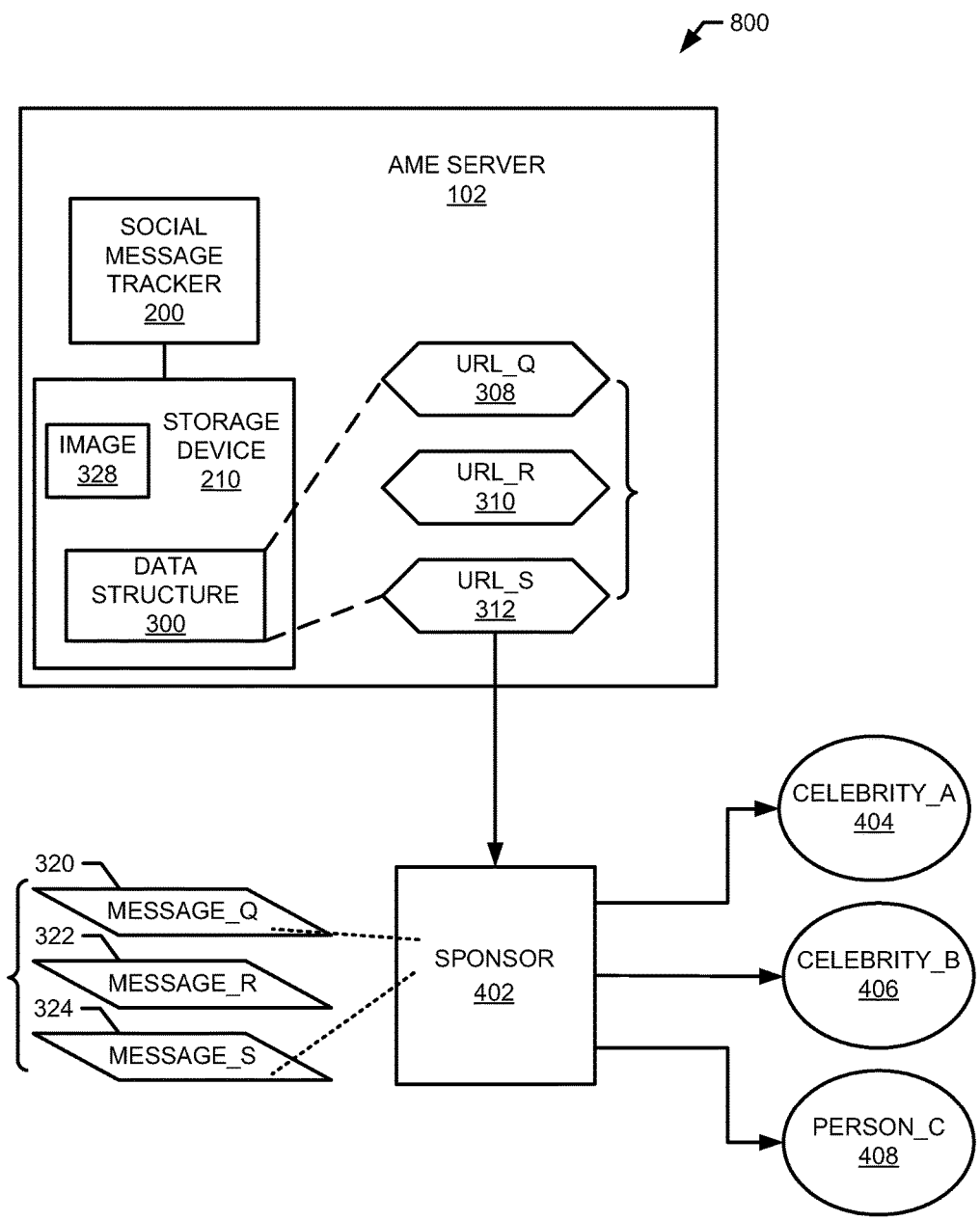
FIG. 8 is an example communication flow diagram illustrating monitoring of impressions of social media messages in the example environment of FIG. 1.

FIG. 8 is an example communication flow diagram to monitor impressions of social media messages in the example environment 100 of FIG. 1. In the illustrated example, the example AME server 102 provides URLs 308, 310 and 312 to an example sponsor 402 for assigning to social media messages. For example, the AME server 102 provides the sponsor 402 the example URL (URL_Q) 308 to include in the example social media message (MESSAGE_Q) 320, the example URL (URL_R) 310 to include in the example social media message (MESSAGE_R) 322, and the example URL (URL_S) 312 to include in the example social media message (MESSAGE_S) 324. In the illustrated example, the example sponsor 402 is a party that enters into agreement(s) with one or more message senders (e.g., celebrities or other well-known individuals, personalities, or entities, real or fictitious) to send social media messages (e.g., the social media messages 320, 322, 324) promoting or endorsing the sponsor, or products or services of the sponsor. In this manner, the example sponsor 402 hopes to increase exposure to or awareness for a sponsor, a product and/or a service when a contracted sender sends a sponsored social media message.

In the illustrated example, the AME server 102 generates a URL that is later encoded in a social media message generated by the sponsor 402 and/or the senders 404, 406, 408. Based on the preferences of the example sponsor 402, the example AME server 102 generates a URL that achieves the goals of the sponsor 402. The AME server 102 generates URLs identifying corresponding media provided by the AME server 102, and that uniquely identify corresponding social media messages. In the illustrated example, the sponsor 402 identifies the three example social media messages Q 320, R 322 and S 324 to track. According to the preferences of the sponsor 402, each of the social media messages (Q 320, R 322 and S 324) when rendered, is to include externally located media (e.g., the example image (IMAGE_2) 328 of FIG. 3). Thus, the example AME server 102 generates the example URL (URL_Q) 308, the example URL (URL_R) 310 and the example URL (URL_S) 312, each of which corresponds to the example image (IMAGE_2) 238. Additionally, each of the generated URLs Q 308, R 310 and S 312 corresponds to a different social media message. In the illustrated example, the URL (URL_Q) 308 corresponds to the example message (MESSAGE_Q) 320, the example URL (URL_R) 310 corresponds to the example message (MESSAGE_R) 322, and the example URL (URL_S) 312 corresponds to the example message (MESSAGE_S) 324.

The generated URLs Q 308, R 310 and S 312 are then stored in a lookup table, such as the example data structure 300, and used by the example social message tracker 200 when crediting a social media message with an impression. In the illustrated example, the data structure 300 is stored in the example storage device 210 of FIG. 2.

In the illustrated example, the AME server 102 provides the generated URLs (Q 308, R 310 and S 312) to the example sponsor 402 for locating in the corresponding social media messages (Q 320, R 322 and S 324). In the illustrated example of FIG. 8, the sponsor 402 contracts with three different message senders including the example sender (Celebrity_A) 404, the example sender (Celebrity_B) 406 and the example sender (PERSON_C) 408 shown in the example data structure 300 of FIG. 3. In addition, the sponsor 402 provides each message sender 404, 406, 408 with a different sponsored social media message (e.g., one of the messages 320, 322, 324) including a corresponding URL (e.g., a corresponding one of the URLs 308, 310, 312) to externally located media. For example, the sponsor 402 embeds the URL (URL_Q) 308 into the social media message (MESSAGE_Q) 320 and provides the sponsored message (MESSAGE_Q) 320 to the sender (Celebrity_A) 404.

In some examples, the AME server 102 generates the messages Q 320, R 322, S 324 and embeds the URLs 308, 310, 312 into corresponding ones of the social media messages 320, 322, 324 and then provides the social media messages 320, 322, 324 including the URLs 308, 310, 312 to the sponsor 402. In other examples, the sponsor 402 provides corresponding ones of the URLs 308, 310, 312 to corresponding ones of the senders 404, 406, 408, and each of the senders 404, 406, 408 generates a corresponding one of the messages 320, 322, 324 and locates its URL 308, 310, 312 in the message 320, 322, 324. In other examples, the AME server 102 may provide the URLs 308, 310, 312 and/or the social media messages 320, 322, 324 to a third-party to further distribute or to convey the sponsored social media messages to other senders.

Figure 4:
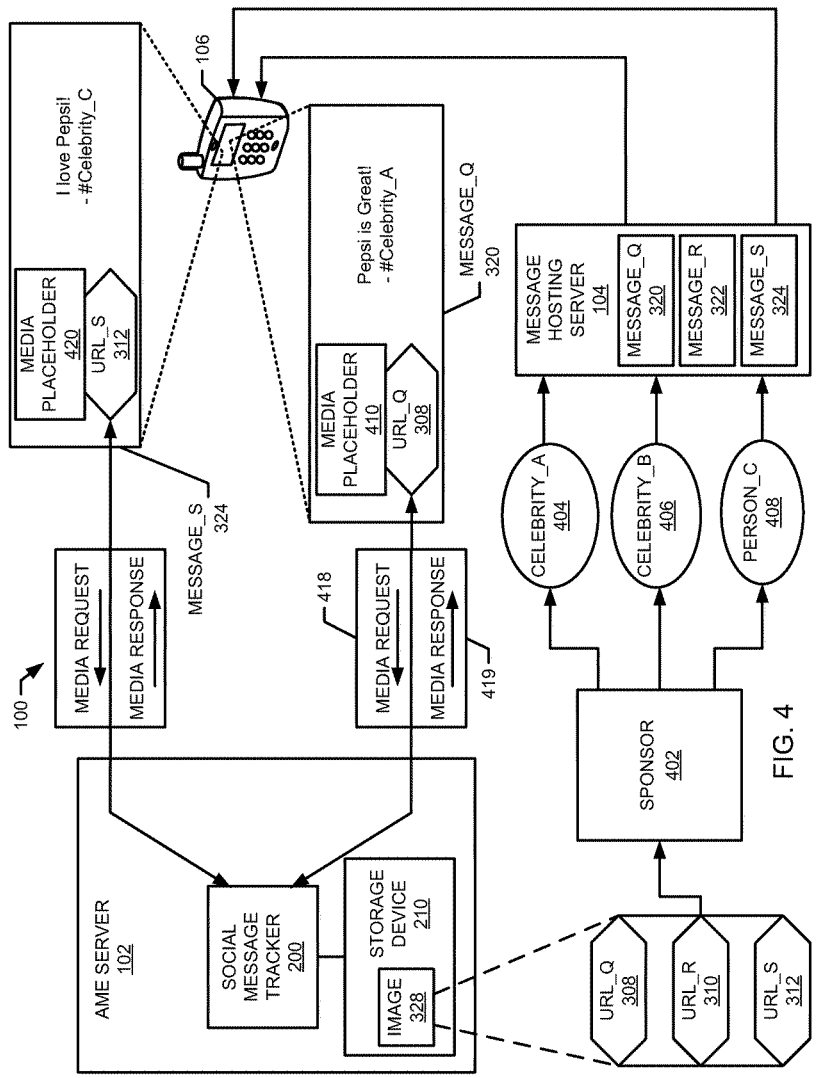
FIG. 4 is an example communication flow diagram illustrating monitoring of impressions of social media messages in the example environment of FIG. 1.

FIG. 4 is an example communication flow diagram to monitor impressions of social media messages in the example environment 100 of FIG. 1. In the illustrated example of FIG. 4, the sponsor 402 contracts with three different message senders including the example sender (Celebrity_A) 404, the example sender (Celebrity_B) 406 and the example sender (Person_C) 408 shown in the data structure 300 of FIG. 3. In addition, the sponsor 402 provides each message sender 404, 406 and 408 with a different sponsored social media message. For example, the sponsor 402 provides the sender (Celebrity_A) 404 with an example sponsored social media message (MESSAGE_Q) 320, and provides the sender (Person_C) 408 with an example sponsored social media message (MESSAGE_S) 324 as shown in FIG. 4 and in the data structure 300 of FIG. 3.

In the illustrated example, each social media message 320, 322 and 324 is to be presented with a same image 328. In addition to or instead of an image, social media messages may be presented with other media (e.g., text, audio, video, etc.). Using the same media 328 as shown in the illustrated examples of FIGS. 3 and 4, the sponsor 402 can maintain brand recognition across the different sponsored social media messages 320, 322 and 324. For example, the image (IMAGE_2) 328 may be an emblem or logo that identifies the sponsor 402 and/or products or services offered by the sponsor 402. In the illustrated example, the sponsor 402 desires to monitor impressions for the sponsored social media messages 320, 322 and 324. In this manner, the sponsor 402 may use the tracked impressions to determine, for example, which message senders and/or which messages are more influential in promoting products or services. Additionally, impression counts may be useful in identifying the effectiveness of certain advertising campaigns (e.g., by calculating the number of impressions per dollar spent).

In the illustrated example, when a message sender (e.g., the example sender (Celebrity_A) 404, the example sender (Celebrity_B) 406 and/or the example sender (Person_C) 408) sends a social media message (e.g., the messages 320, 322 and/or 324), the example message hosting server 104 receives, stores and distributes the social media message (e.g., to followers or subscribers of the senders 404, 406, 408).

In the illustrated example, the example client device 106 renders social media messages received from the message hosting server 104 to display or present to a user. The social media messages monitored in the illustrated examples (e.g., social media messages being monitored by the example AME server 102) include links to externally located media 328 (e.g., externally stored media referenced by a URL embedded in the message). In the illustrated examples, the media 328 is retrieved by the client device 106 and embedded into the social media message when the social media message is rendered at the client device 106. Some social media messages may additionally include embedded media (e.g., images, text, audio, video, etc.) that is included in the message sent by the message hosting server 104. In the illustrated example, a sponsored social media message received by the client device 106 includes a media placeholder having a URL corresponding to externally linked media. For example, the sponsored social media message (MESSAGE_Q) 320 includes an example media placeholder 410 including an example URL (URL_Q) 308 corresponding to the example image (IMAGE_2) 328. In the illustrated example, the client device 106 requests and receives the image (IMAGE_2) 328 by sending an example media request 418 to a server URL specified by the URL (URL_Q) 308. In the illustrated example, the image (IMAGE_2) 328 is stored at the AME server 102 and the URL (URL_Q) 308 directs the media request 418 to the AME server 102.

In the illustrated example, the AME server 102 includes the example social message tracker 200 of FIG. 2 to monitor impressions of social media messages. In the illustrated example of FIG. 4, the example external interface 202 of FIG. 2 receives the media requests for the image 328. In the illustrated example, the social message tracker 200 analyzes the URL (URL_Q) 308 using a data structure, such as the example data structure 300 of FIG. 3, to find a corresponding image and a corresponding social media message. For example, when the example URL analyzer 204 of the social message tracker 200 receives a media request addressed to the example URL (URL_Q) 308, the URL analyzer 204 informs the example media provider 206 of the corresponding image (IMAGE_2) 328. In the illustrated example, the media provider 206 locates the example image (IMAGE_2) 328 and retrieves the example image (IMAGE_2) 328 from a media database such as the storage device 210 of FIGS. 2 and/or 4. In some examples, the media provider 206 and/or the storage device 210 may not be included in the social message tracker 200 and/or the AME server 102 of FIG. 4. In the illustrated example, the example social message tracker 200 sends the example image (IMAGE_2) 328 to the requesting device 106 via the external interface 202 in a media response 419.

The example social message tracker 200 of the illustrated example also uses the example data structure 300 of FIG. 3 to determine which social media message to credit with an impression based on the received URL. In the illustrated example, the impression logger 208 of FIG. 2 credits the example message (MESSAGE_Q) 320 with an impression based on an indication of the URL (URL_Q) 308 received from the URL analyzer 204 by, for example, incrementing a corresponding counter (e.g., one of the counters 208 of FIG. 2). Using a similar process, the example impression logger 208 credits the message (MESSAGE_S) 324 with an impression based on an indication of the URL (URL_S) 312 received from the URL analyzer 204. In this manner, two different URLs (e.g., the example URL (URL_Q) 308 and the example URL (URL_S) 312) map to the same media (e.g., the example image (IMAGE_2) 328), but still contribute to crediting two different social media messages (e.g., the example social media message (MESSAGE_Q) 320 and the example social media message (MESSAGE_S) 324) with an impression.

Figure 5:
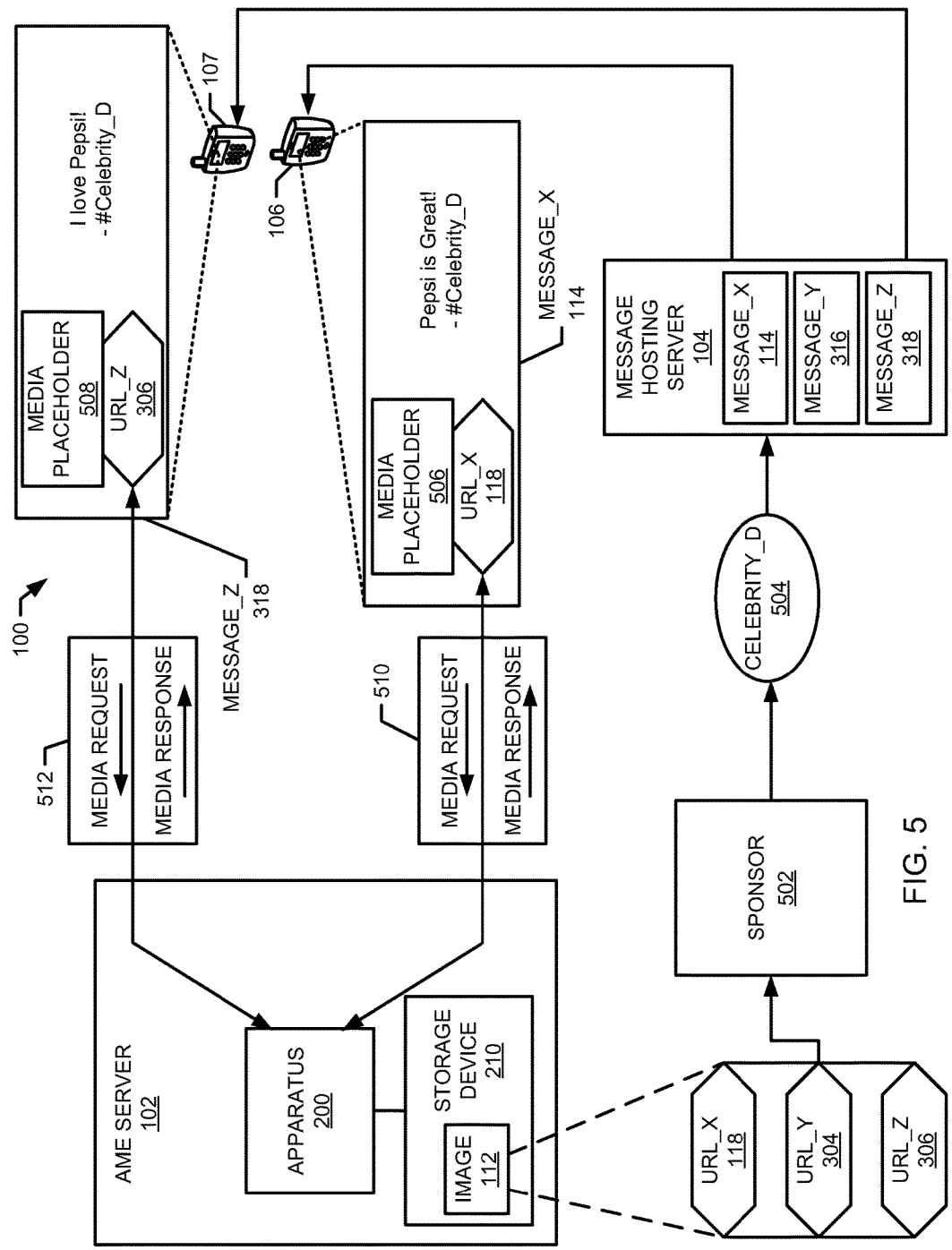
FIG. 5 is another example communication flow diagram illustrating monitoring of impressions of social media messages in the example environment of FIG. 1.

FIG. 5 is another example communication flow diagram to monitor impressions of social media messages in the example environment 100 of FIG. 1. In the illustrated example, an example sponsor 502 enters into an agreement with a message sender to send social media messages. In the illustrated example of FIG. 5, the sponsor 502 contracts with a message sender (e.g., an example sender (Celebrity_D) 504 shown in FIG. 5 and in the data structure 300 of FIG. 3) to send three different social media messages (e.g., the example message (MESSAGE_X) 114a, the example message (MESSAGE_Y) 316 and the example message (MESSAGE_Z) 318). Each of the social media messages 114a, 316 and 318 includes a text portion and externally accessible linked media. For example, the message (MESSAGE_X) 114a includes an automatically activatable link to the image (IMAGE_1) 112. In the illustrated example, the example sender (Celebrity_D) 504 sends the example message (MESSAGE_X) 114a, the example message (MESSAGE_Y) 316 and the example message (MESSAGE_Z) 318, which are received, stored/hosted and distributed by the example message hosting server 104.

In the illustrated example, the social media messages 114a and 318 are sent from the message hosting server 104 to example client devices 106 and 107 without the image (IMAGE_1) 112, but instead include an automatically activatable link to the image 112. In the illustrated example, the example message hosting server 104 sends to the client device 106 the example message (MESSAGE_X) 114a including an example media placeholder 506 (including the example URL (URL_X) 118), and sends to the example client device 107 the example message (MESSAGE_Z) 318 including an example media placeholder 508 (including the example URL (URL_Z) 306).

In response to accessing the message (MESSAGE_X) 114a, the client device 106 sends an example media request 510 addressed to the example URL (URL_X) 118, which directs the request 510 to the example AME server 102 to request the image (IMAGE_1) 112. In a similar manner, in response to accessing the message (MESSAGE_Z) 318, the client device 107 sends an example media request 512 addressed to the example URL (URL_Z) 306, which directs the media request 512 to the example AME server 102 requesting the same image (IMAGE_1) 112.

In the illustrated example, the external interface 202 of FIG. 2 receives media requests from client devices requesting media to be presented with social media messages. In the illustrated example, the social message tracker 200 identifies images and social media messages corresponding to the URLs to which media requests are addressed. For example, the social message tracker 200 may use the example data structure 300 of FIG. 3 to determine a requested image and a social media message corresponding to a URL to which a received media request was addressed. For example, the social message tracker 200 looks up the corresponding social media message (MESSAGE_X) 114a for the URL (URL_X) 118, and looks up the corresponding social media message (MESSAGE_Z) 318 for the URL (URL_Z) 306. As a result, the social message tracker 200 credits the messages 114a and 318 with corresponding impressions by, for example, incrementing a corresponding counter (e.g., one of the counters 208 of FIG. 2). In this manner, the AME server 102 collects impressions of social media messages.

In the illustrated example, after determining that the media request 510 is requesting the image 112 based on being addressed to the URL 118, the social message tracker 200 sends the requested image (IMAGE_1) 112 to the example client device 106 to render the social media message (MESSAGE_X) 114. Similarly, the social message tracker 200 selects the image 112 for the client device 107 based on the media request 512 being addressed to the URL (URL_Z) 306, and sends the image 112 to the example client device 107 to render the social media message (MESSAGE_Z) 318.

Figure 6:
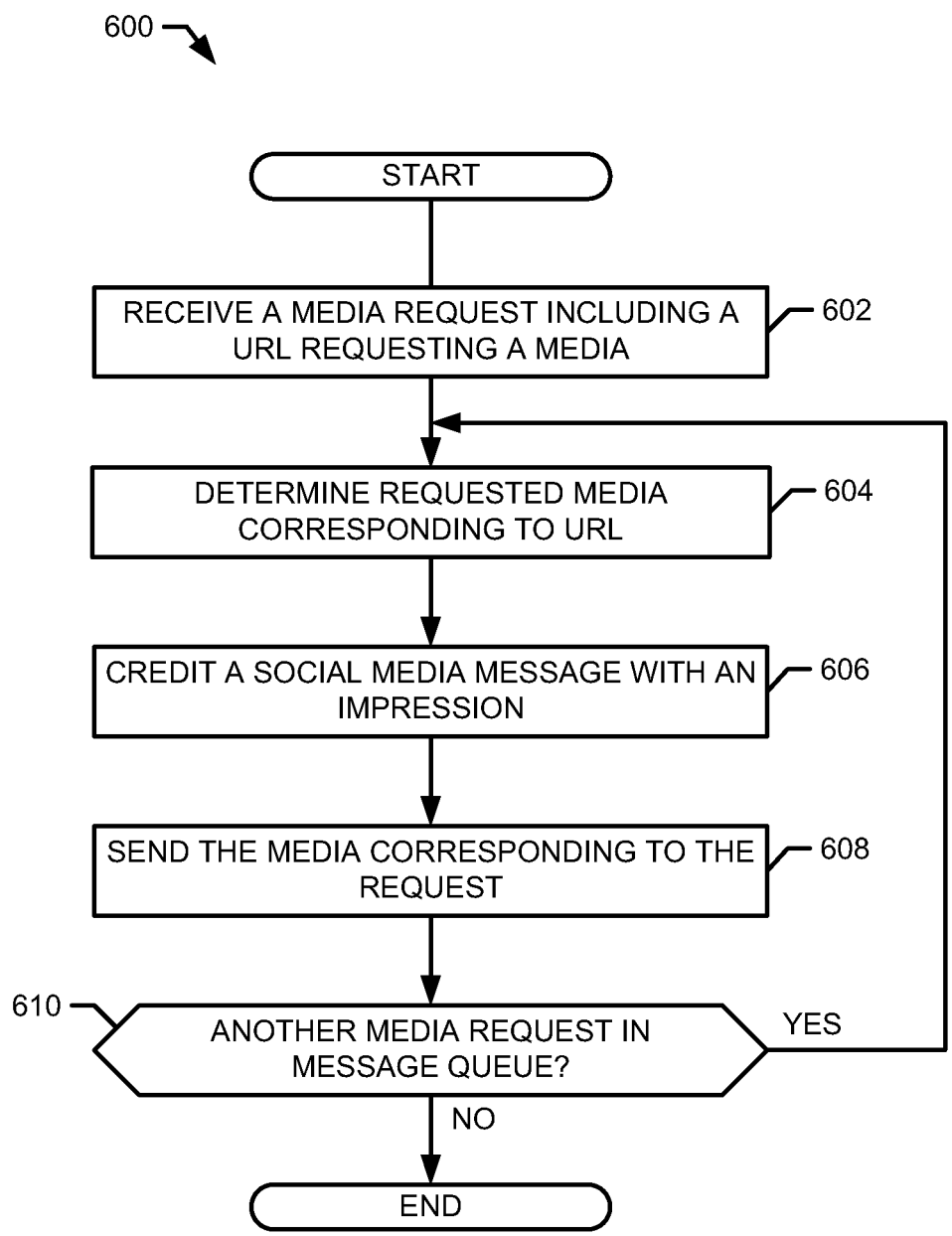
FIG. 6 is a flowchart representative of example machine readable instructions that may be executed to log an impression for a social media message.
Figure 7:
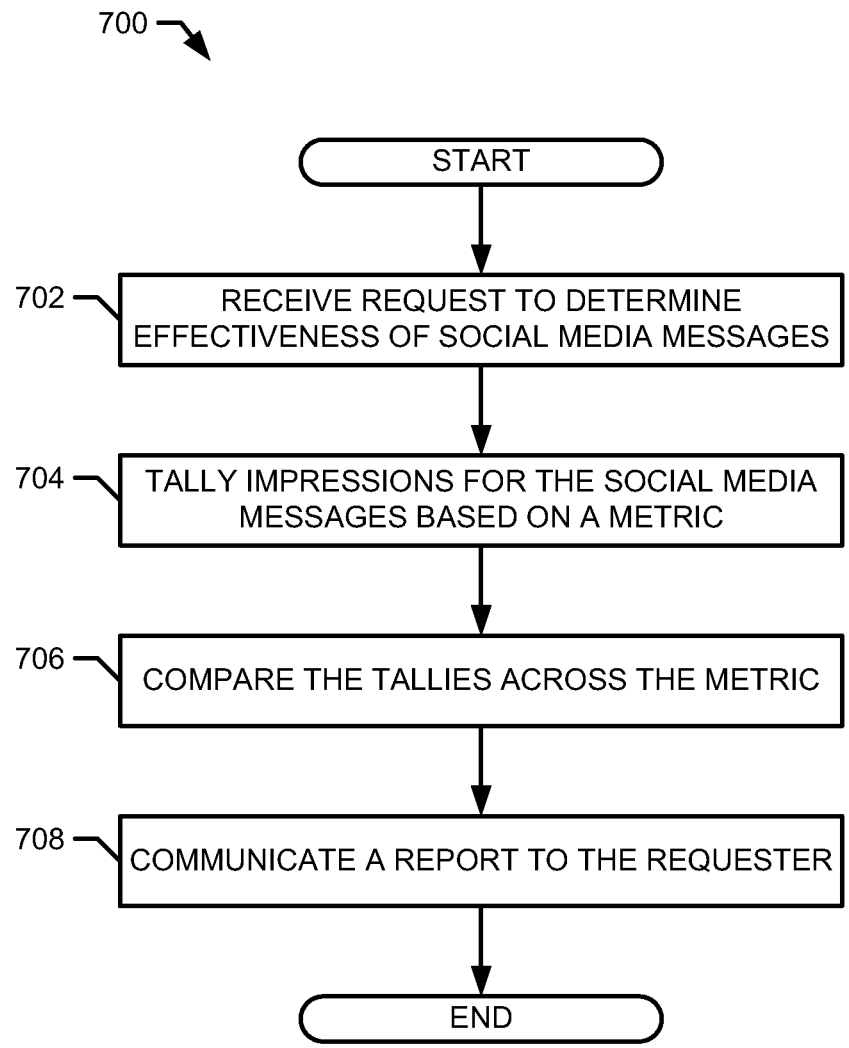
FIG. 7 is a flowchart representative of example machine readable instructions that may be executed to determine an effectiveness of a media campaign.

Flowchart representative of example machine readable instructions for implementing the social message tracker 200 of FIG. 2 are shown in FIGS. 6 and 7. In this example, the machine readable instructions comprise programs for execution by a processor such as the processor 912 shown in the example processing platform 900 discussed below in connection with FIG. 9. The programs may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowcharts illustrated in FIGS. 6 and 7, many other methods of implementing the social message tracker 200 of FIG. 2 may alternatively be used. For example, the order of execution of the blocks may be changed, and/or some of the blocks described may be changed, eliminated, or combined.

The example processes of FIGS. 6 and 7 may be implemented using coded instructions (e.g., computer readable instructions) stored on a tangible computer readable storage medium (e.g., a computer readable storage device or storage disk) such as a hard disk drive, a flash memory, a read-only memory (ROM), a compact disk (CD), a digital versatile disk (DVD), a cache, a random-access memory (RAM) and/or any other physical storage structure in which information is stored for any duration (e.g., for extended time periods, permanently, brief instances, for temporarily buffering, and/or for caching of the information). As used herein, the term tangible computer readable storage medium is expressly defined to include any type of computer readable storage device or storage disc and to exclude propagating signals. Additionally or alternatively, the example processes of FIGS. 6 and 7 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The program of FIG. 6 begins at block 602 at which the example external interface 202 (FIG. 2) receives a media request. For example, the external interface 202 receives the example media request 120 (FIG. 1) (including the example URL 118) sent by the client device 106 (FIG. 1) to the example AME server 102 (FIG. 1) requesting the example image 112 (FIG. 1).

At block 604, the social message tracker 200 identifies the requested media. For example, the example URL analyzer 204 (FIG. 2) looks up the requested media based on the received URL 118 using the data structure 300 (FIG. 3), and forwards the media (e.g., the image 112 or an indication thereof) to the example media provider 206.

At block 606, the social message tracker 200 credits a social media message corresponding to the URL with an impression. For example, the example URL analyzer 204 identifies the example message 114a based on the URL 118 using the data structure 300, and informs the example impression logger 208 (FIG. 2) to credit the message 114a with an impression. In some examples, the impression logger 208 logs an entry when crediting (or logging) a social media message with an impression. In some such examples, the impression logger 208 may add additional information to the entry. For example, the impression logger 208 may include a timestamp, a device identifier included in the media request, and/or any other information that may provide additional information regarding the impression.

At block 608, the social message tracker 200 sends the requested media to the requesting device. For example, the media provider 206 receives the image 112 from the URL analyzer 204 or retrieves the image 112 from the example storage device 210, and the social message tracker 200 sends the image 112 to the client device 106 at block 608. At block 610, the social message tracker 200 determines whether there is another media request to process. For example, the example URL analyzer 204 determines whether there is another media request stored in the example message queue 212 (FIG. 2). If the example URL analyzer 204 determines there is another media request in the message queue 212, control returns to block 604. If the example URL analyzer 204 determines there is not another URL in the message queue, the example process 600 ends.

The program of FIG. 7 begins at block 702 at which the example AME server 102 (FIG. 1) receives a request to determine the effectiveness of a media campaign (e.g., a messaging campaign, an advertising campaign, a promotional campaign, etc.). For example, the example AME server 102 receives a request from the example sponsor 402

(FIG. 4) to determine the effectiveness of their media campaign including social media messages Q 320, R 322, S 324. In some examples, the request is received periodically, aperiodically and/or event-driven. Although not shown in FIG. 7, to track impressions of social media messages, the AME server 102 may use techniques disclosed herein to associate URLs with social media messages and media at the AME server 102.

At block 704, the example impression logger 208 (FIG. 2) tallies the number of impressions for the relevant social media messages (e.g., the example message (MESSAGE_Q) 320, the example message (MESSAGE_R) 322 and the example message (MESSAGE_S) 324). For example, the AME server 102 tallies impressions based on received media requests as disclosed herein. The impressions may be tallied in any desired (or suitable) fashion based on different metrics. For example, the example impression logger 208 tallies the number of impressions according to the different social media messages specified by the sponsor 402. In such examples, the example sponsor 402 compares the cumulative impression numbers for each social media message (Q 320, R 322, S 324) to determine the effectiveness of each of the social media message (block 706).

In some examples, at block 704, the example impression logger 208 tallies the number of impressions according to the different device identifiers (e.g., the device identifier 220 of FIG. 2). In such examples, the effectiveness of the media campaign can be based on a comparison, at block 706, of the total number of unique device identifiers for each social media message. In addition, the device identifiers may be used to determine whether a client device that requested the example message (MESSAGE_Q) 320 is more likely or less likely to request another social media message in the same media campaign.

In some examples, at block 704, the example impression logger 208 tallies the number of impressions according to timestamps (e.g., the timestamps 216 of FIG. 2) appended with the impressions data. In such examples, a comparison, at block 706, of the number of impressions for the social media messages during different timestamp ranges indicates the effectiveness of the different social media messages throughout the day. For example, certain social media messages may be requested during the early morning hours. Additionally or alternatively, social media messages conveyed by a certain message sender may generate more media requests during the early morning hours. Thus, it may be beneficial for a purveyor of goods or services that caters to early morning customers to form an agreement with the message sender.

In some examples, at block 704, the example impression logger 208 tallies the number of impressions according to a campaign ID (e.g., the campaign ID 218 of FIG. 2) or a URL (e.g., any of the URLs 118, 304, 306, 308, 310, 312, 330, 332, 334, 348, 350, 352 of FIG. 3). For example, the total number of impressions logged for the social media messages included in media campaign is tallied. In such examples, a comparison, at block 706, of the total numbers across previous media campaigns may be used to determine the effectiveness of certain media campaigns over others. For example, the effectiveness of a media campaign may be determined based on a comparison of the number of impressions logged from the media campaign divided by the amount of money (e.g., number of dollars) spent on the media campaign. This data may be further analyzed to determine, for example, which message senders were more effective relative to the amount of money paid to the message sender.

At block 708 of FIG. 7, the results are prepared in a report and communicated to the requesting sponsor. The example process 700 of FIG. 7 then ends.

Figure 9:
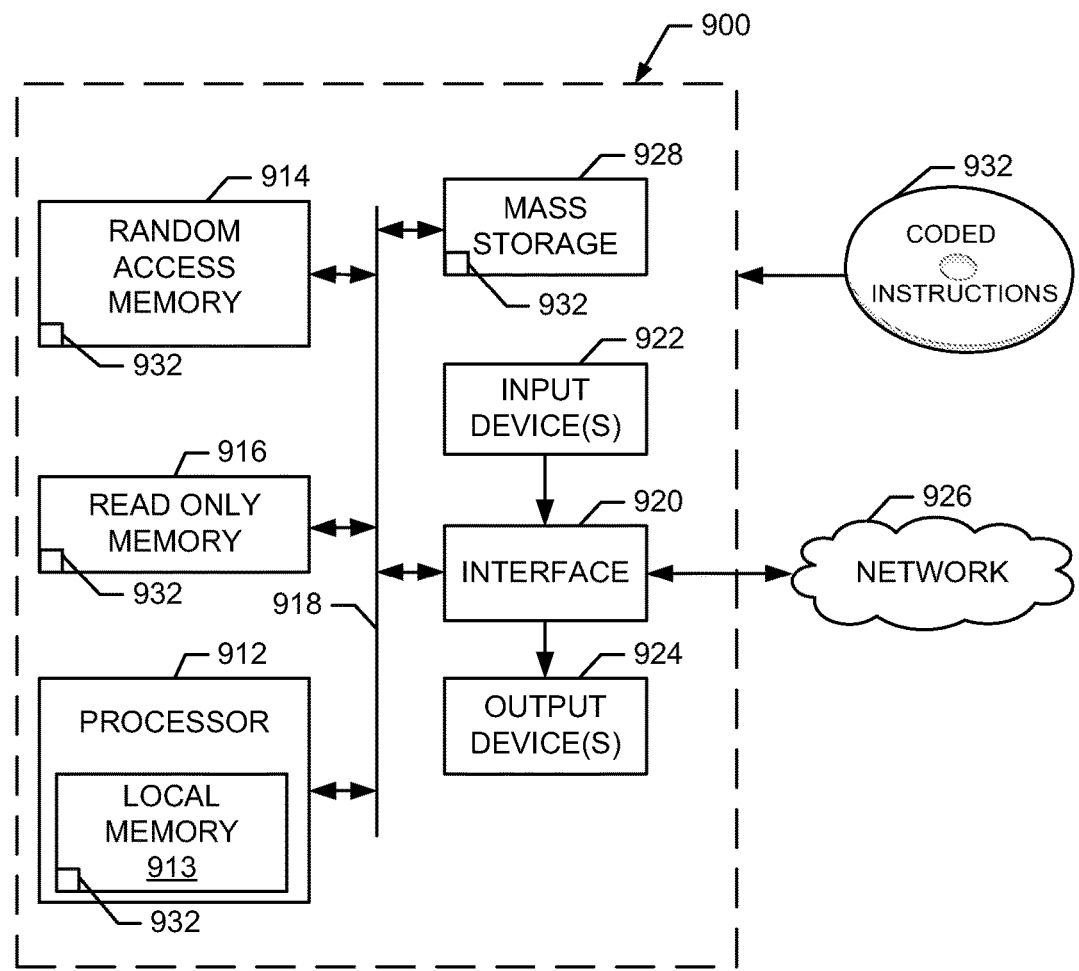
FIG. 9 is a block diagram of an example processing platform capable of executing the example machine readable instructions of FIGS. 6 and 7 to implement the example social message tracker of FIG. 2.

FIG. 9 is a block diagram of an example processing platform 900 capable of executing the instructions of FIGS. 6 and 7 to implement the social message tracker 200 of FIG. 2. The processing platform 900 can be, for example, a server, a personal computer, an Internet appliance, or any other type of computing device.

The processing platform 900 of the instant example includes a processor 912. For example, the processor 912 can be implemented by one or more microprocessors or controllers from any desired family or manufacturer.

The processor 912 includes a local memory 913 (e.g., a cache) and is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processing platform 900 also includes an interface circuit 920. The interface circuit 920 may be implemented by any type of interface standard, such as an Ethernet interface, a universal serial bus (USB), and/or a PCI express interface.

One or more input devices 922 are connected to the interface circuit 920. The input device(s) 922 permit a user to enter data and commands into the processor 912. The input device(s) can be implemented by, for example, a keyboard, a mouse, a touchscreen, a track-pad, a trackball, isopoint and/or a voice recognition system.

One or more output devices 924 are also connected to the interface circuit 920. The output devices 924 can be implemented, for example, by display devices (e.g., a liquid crystal display, a cathode ray tube display (CRT), a printer and/or speakers). The interface circuit 920, thus, typically includes a graphics driver card.

The interface circuit 920 also includes a communication device such as a modem or network interface card to facilitate exchange of data with external computers via a network 926 (e.g., an Ethernet connection, a digital subscriber line (DSL), a telephone line, coaxial cable, a cellular telephone system, etc.).

The processing platform 900 also includes one or more mass storage devices 928 for storing software and data. Examples of such mass storage devices 928 include floppy disk drives, hard drive disks, compact disk drives and digital versatile disk (DVD) drives. The mass storage device 928 may implement a local storage device.

Coded instructions 932 representative of the machine readable instructions of FIGS. 6 and 7 may be stored in the mass storage device 928, in the volatile memory 914, in the non-volatile memory 916, and/or on a removable storage disc such as a CD or DVD.

From the foregoing, it will appreciate that the above disclosed methods, apparatus and articles of manufacture enable monitoring exposures to advertisements delivered via social media message and provide a vehicle for detecting the effectiveness of such messages and/or the provider of such messages.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method, comprising:

generating, at a first server, a first uniform resource locator associated with media to present the media in a first social media message and a second uniform resource locator associated with the same media to present the media in a second social media message, the second uniform resource locator different than the first uniform resource locator;

transmitting, from the first server, the first uniform resource locator and the second uniform resource locator to a second server to direct the second server to embed the first uniform resource locator into the first social media message and to embed the second uniform resource locator into the second social media message;

in response to receiving a first request addressed to the first uniform resource locator:

transmitting, from the first server, the media to a first device; and logging, at the first server, a first impression for the first social media message; and in response to receiving a second request addressed to the second uniform resource locator:

transmitting, from the first server, the media to a second device; and logging, at the first server, a second impression for the second social media message.

2. The method as defined in claim 1, further including providing the first uniform resource locator to a first message sender to send with the first social media message.

3. The method as defined in claim 1, further including determining an effectiveness of a media campaign including the first social media message and the second social media message.

4. The method as defined in claim 3, wherein the determining of the effectiveness of the media campaign includes:

tallying a first number of impressions of the first social media message, the first uniform resource locator corresponding to a unique identifier included in the first social media message;

tallying a second number of impressions of the second social media message, the second uniform resource locator corresponding to a unique identifier included in the second social media message; and generating a report based on a comparison of the first number to the second number.

5. The method as defined in claim 3, wherein the logging of the first impression includes recording a first timestamp with the first impression, the first timestamp representing when the first social media message was received at the server, the logging of the second impression including recording a second timestamp with the second impression, the second timestamp representing when the second social media message was received at the server.

6. The method as defined in claim 5, wherein the determining of the effectiveness of the media campaign includes:

tallying a first number of impressions of the first social media message and the second social media message that were received at the server during a first timestamp range;

tallying a second number of impressions of the first social media message and the second social media message that were received at the server during a second timestamp range; and generating a report based on a comparison of the first number to the second number.

7. The method as defined in claim 3, wherein the determining of the effectiveness of the media campaign includes:

tallying a first number of impressions of the first social media message and the second social media message associated with a first device identifier, the first device identifier associated with a first requesting device, the first requesting device accessing a first one of the first social media message or the second social media message;

tallying a second number of impressions of the first social media message and the second social media message associated with a second device identifier, the second device identifier associated with a second requesting device, the second requesting device accessing a second one of the first social media message or the second social media message; and generating a report based on a comparison of the first number to the second number.

8. The method as defined in claim 3, wherein the determining of the effectiveness of the media campaign includes:

tallying a number of impressions of the first social media message and the second social media message during a time period; and generating a report based on a comparison of the number to an amount of money spent on the media campaign during the time period.

9. An apparatus, comprising:

a first server to:

generate, a first uniform resource locator associated with media to present the media in a first social media message and a second uniform resource locator associated with the same media to present the media in a second social media message, the second uniform resource locator different than the first uniform resource locator; and transmit the first uniform resource locator and the second uniform resource locator to a second server to cause the second server to embed the first uniform resource locator into the first social media message and to embed the second uniform resource locator into the second social media message;

an impression logger to:

in response to receiving a first request addressed to the first uniform resource locator:

transmit the media to a first device; and log a first impression for the first social media message; and in response to receiving a second request addressed to the first uniform resource locator:

transmit the media to a second device; and log a second impression for the second social media message.

10. The apparatus as defined in claim 9, further including a social message tracker to determine an effectiveness of a media campaign including the first social media message and the second social media message.

11. The apparatus as defined in claim 10, wherein the impression logger is to:
tally a first number of impressions of the first social media message, the first uniform resource locator corresponding to a unique identifier included in the first social media message; and
tally a second number of impressions of the second social media message, the second uniform resource locator corresponding to a unique identifier included in the second social media message.

12. The apparatus as defined in claim 11, wherein the social message tracker is to generate a report based on a comparison of the first number to the second number.

13. The apparatus as defined in claim 10, wherein the impression logger is to:
record a first timestamp with the first impression, the first timestamp representing when the first social media message was received at the impression logger; and
record a second timestamp with the second impression, the second timestamp representing when the second social media message was received at the impression logger.

14. The apparatus as defined in claim 13, wherein the impression logger is to:
tally a first number of impressions of the first social media message and the second social media message that were received at the impression logger during a first timestamp range; and
tally a second number of impressions of the first social media message and the second social media message that were received at the impression logger during a second timestamp range.

15. The apparatus as defined in claim 14, wherein the social message tracker is to generate a report based on a comparison of the first number to the second number.

16. The apparatus as defined in claim 10, wherein the impression logger is to:
tally a first number of impressions of the first social media message and the second social media message associated with a first device identifier, the first device identifier associated with a first requesting device, the first requesting device accessing a first one of the first social media message or the second social media message; and
tally a second number of impressions of the first social media message and the second social media message associated with a second device identifier, the second device identifier associated with a second requesting device, the second requesting device accessing a second one of the first social media message or the second social media message.

17. The apparatus as defined in claim 16, wherein the social message tracker is to generate a report based on a comparison of the first number to the second number.

18. The apparatus as defined in claim 10, wherein the impression logger is to tally a number of impressions of the first social media message and the second social media message received at the impression logger during a time period, and
the social message tracker is to generate a report based on a comparison of the number to an amount of money spent on the media campaign during the time period.

19. A tangible computer readable storage medium comprising instructions that, when executed, cause a first server to at least:
generate a first uniform resource locator associated with media to present the media in a first social media message and a second uniform resource locator associated with the same media to present the media in a second social media message, the second uniform resource locator different than the first uniform resource locator;
transmit the first uniform resource locator and the second uniform resource locator to a second server to cause the second server to embed the first uniform resource locator into the first social media message and to embed the second uniform resource locator into the second social media message;
in response to receiving a first request addressed to the first uniform resource locator:
transmit the media to a first device; and
log a first impression for the first social media message; and
in response to receiving a second request addressed to the first uniform resource locator:
transmit the media to a second device; and
log a second impression for the second social media message.

20. The tangible computer readable storage medium as defined in claim 19, wherein the instructions further cause the server to provide the first uniform resource locator to a first message sender to send with the first social media message.

21. The tangible computer readable storage medium as defined in claim 19, wherein the instructions further cause the server to determine the effectiveness of a media campaign including the first social media message and the second social media message by:
tallying a first number of impressions of the first social media message, the first uniform resource locator corresponding to a unique identifier included in the first social media message;
tallying a second number of impressions of the second social media message, the second uniform resource locator corresponding to a unique identifier included in the second social media message; and
generating a report based on a comparison of the first number to the second number.

22. The tangible computer readable storage medium as defined in claim 19, wherein the instructions further cause the server to:
record a first timestamp with the first impression, the first timestamp representing when the first social media message was received at the server; and
record a second timestamp with the second impression, the second timestamp representing when the second social media message was received at the server.

23. The tangible computer readable storage medium as defined in claim 22, wherein the instructions further cause the server to determine an effectiveness of a media campaign including the first social media message and the second social media message by:
tallying a first number of impressions of the first social media message and the second social media message that were received at the server during a first timestamp range;
tallying a second number of impressions of the first social media message and the second social media message that were received at the server during a second timestamp range; and
generating a report based on a comparison of the first number to the second number.

24. The tangible computer readable storage medium as defined in claim 19, wherein the instructions further cause the server to determine an effectiveness of a media campaign including the first social media message and the second social media message by:

tallying a first number of impressions of the first social media message and the second social media message associated with a first device identifier, the first device identifier associated with a first requesting device, the first requesting device accessing a first one of the first social media message or the second social media message;

tallying a second number of impressions of the first social media message and the second social media message associated with a second device identifier, the second device identifier associated with a second requesting device, the second requesting device accessing a second one of the first social media message or the second social media message; and generating a report based on a comparison of the first number to the second number.

25. The tangible computer readable storage medium as defined in claim 19, wherein the instructions further cause the server to determine an effectiveness of a media campaign including the first social media message and the second social media message by:

tallying a number of impressions of the first social media message and the second social media message during a time period; and generating a report based on a comparison of the number to an amount of money spent on the media campaign during the time period.

* * * * *